March 1, 1927.

W. BROAD

TESTING INSTRUMENT

Filed June 5, 1924

1,619,699

INVENTOR
William Broad,
by Byrnes, Stebbins & Parmelee,
his Attys.

Patented Mar. 1, 1927.

1,619,699

UNITED STATES PATENT OFFICE.

WILLIAM BROAD, OF BEAVER FALLS, PENNSYLVANIA, ASSIGNOR OF THREE-FOURTHS TO H. E. McLAIN, OF PITTSBURGH, PENNSYLVANIA.

TESTING INSTRUMENT.

Application filed June 5, 1924. Serial No. 718,006.

The present invention relates broadly to testing instruments, and more particularly to a miniature millivolt testing battery for high resistance circuits, or circuits containing delicate instruments to which the application of an appreciable voltage or current might prove disastrous.

Great difficulty is sometimes encountered in the testing of high resistance circuits due to inability to produce a current flow sufficient to give an indication of the condition of the circuit being tested. I have found that with a voltaic cell constructed in accordance with the present invention, and operating to produce only a small fraction of a volt it is possible to give an effective indication through circuits having resistances well in excess of 50,000 ohms.

The increasing use of radio receiving and transmitting sets utilizing extremely delicate instruments offers another field for a small millivolt testing battery which may be easily and inexpensively procured and operated.

In certain cases, as for example in mines, powder plants and the like, where explosive gases or materials are present, it is frequently necessary to make tests for circuits on different pieces of electrical equipment. In such cases, it is essential that the testing instruments be so constructed as to prevent the possibility of a spark capable of producing an explosion.

The present invention has for its object the production of a testing battery meeting the requirements referred to, and of such construction that it may be operated over a period of years without appreciable deterioration, the actual deterioration depending upon the actual length of time the battery is in active service.

In the accompanying drawings, there are shown for purposes of illustration only certain preferred embodiments of the present invention, it being understood that the drawings do not define the limits of my invention as changes in the construction and operation disclosed therein may be made without departing from the spirit of the invention or the scope of my broader claims.

In the drawings:—

Figure 5:
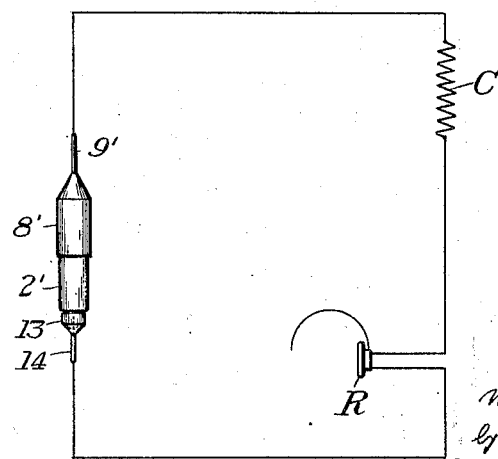
Figure 5 is a diagrammatic view illustrating one form of testing circuit.

While in accordance with the present invention the actual size of the battery is relatively immaterial, it may be stated that for general purposes the battery is very small, it being in fact much smaller than indicated in any of the drawings with the possible exception of Figure 5, in which it is shown in substantially full size. As will be apparent from the claims, however, the invention is not limited in this respect, it merely being possible, by reason of the construction illustrated, to make an extremely small and compact battery which may be inexpensively manufactured and sold accordingly.

Figure 1:
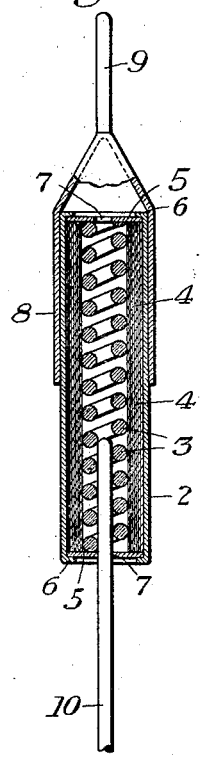
Figure 1 is a vertical sectional view, certain of the parts being shown in elevation, of one form of testing battery embodying the present invention.
Figure 2:
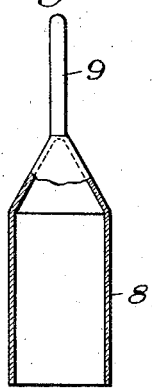
Figure 2 is a detail view, partly broken away, of the removable cap.

In the embodiment illustrated in Figure 1, there is provided a casing 2, constituted by a conductor of the first class such as zinc. The casing as initially formed is preferably of truly cylindrical shape having a constant internal diameter. Within the casing, there is inserted a second conductor of the first class conveniently comprising a length of copper bent in the form of a spring 3. Intermediate the two conductors of the first class is an absorbent material such as a plurality of layers of paper 4. After the spring 3 and the absorbent material have been inserted into the casing, fiber disks 5 are preferably placed in the ends thereof, and the ends 6 thereupon bent or spun inwardly to effectively hold the parts in position.

In accordance with the preferred embodiment of the present invention, the spring 3 will preferably have a normal length slightly in excess of the length of the casing, whereby when the ends 6 are bent inwardly, the coils of the spring will be held under compression. This exerts an outward pressure on the disks 5 tending to hold the parts firmly in position. Each of the disks 6 preferably has a central opening 7 adapted not only to permit the application of desired quantity of a conductor of the second class, but also permitting connection to be established with the inner conductor. Adapted to tightly engage either end of the casing is a cap 8 preferably of the same material as that of which the casing is constructed, and having projecting therefrom a tip or connection 9 of suitable material. When it is desired to place the battery in operation, the cap 8 is removed and a very small quantity of a suitable electrolyte, constituting a conductor of the second class, is applied to the opening 7 in one of the disks. The desired results may easily be obtained by simply moistening the disk with the end of one of the fingers. The cap is thereafter applied, and a connection 10 slipped through the other opening 7 into contact with the spring. Upon connecting the ends of the circuit to be tested with the tips 9 and 10, respectively, and including within the circuit a suitable indicating instrument, such as a sensitive telephone receiver, there will be produced a minute current flow which will give an audible signal in the receiver. By repeatedly opening and closing the circuit, a series of such signals will be given. In actual practice, it has been found that a voltaic cell of the construction described has the ability to give a signal of this character through a circuit of extremely high resistance without any possibility of producing a spark, and without the generation of current to an extent sufficient to injure even the most sensitive instrument.

Figure 3:
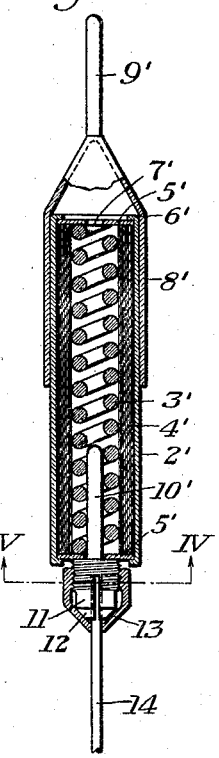
Figure 3 is a view similar to Figure 1 illustrating a slightly modified embodiment of the invention.
Figure 4:
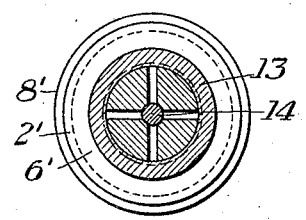
Figure 4 is a detail sectional view on an enlarged scale on the line IV—IV of Figure 3.

In Figures 3 and 4, there is illustrated a slightly modified embodiment of the invention, in which parts corresponding to parts already described are designated by the same reference characters having a prime affixed thereto. In this form of the invention, the tip 10' is connected to a chuck 11 comprising spring fingers having inclined outer ends 12 adapted to be engaged by a cap 13 and forced inwardly into engagement with a wire 14 or the like with which it is desired to make connection. The tip 10' may either be loosely inserted, or may be soldered within the coil as may be desired. It will be apparent that the provision of a chuck 11 makes it possible to establish efficient connection with conductors of different sizes.

In Figure 5, there is illustrated a cell of the character shown more particularly in Figure 3 in series with a resistance C indicating the circuit to be tested and a receiver R indicating diagrammatically the testing instrument employed.

Figure 6:
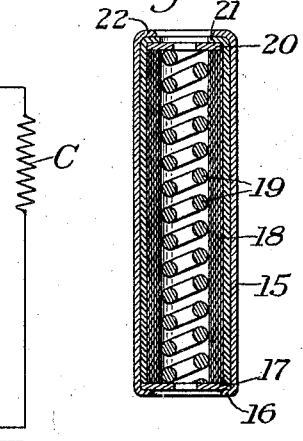
Figure 6 is a view similar to Figure 1 illustrating still another embodiment of the present invention.

In the form of the invention illustrated in Figure 6, the entire structure is shown as enclosed within a protective casing 15. This casing may be of any desired material, either metallic or non-metallic, although preferably due to the ease of working, I employ brass in actual practice. In assembling the cell, the casing is first formed with a slightly inturned end 16. A fiber washer 17 is then placed within the casing against the inturned flange. There is then slipped into the casing a zinc cartridge containing therein an absorbent material 18 and a copper spring 19. The absorbent material and the spring may be held in position within the zinc cartridge by a washer 20 engaged by the inturned end 21 of the zinc. Thereafter, the end of the casing 15 is turned inwardly as indicated at 22 to hold all of the parts firmly in position.

The use of a protective casing not only shields the conductors utilized, but also makes it possible to assemble the two conductors of the first class in different relationships.

In actual use, the amount of electrolyte applied will be determined upon the length of time which it is desired to maintain the cell in operation. An extremely small drop of electrolyte applied as herein described is sufficient to maintain the cell in operation for several hours. By thus limiting the quantity of electrolyte, the chemical action on the zinc may be reduced to a minimum whereby the length of life of the cell is materially increased, there being no deterioration unless the cell is in actual use.

The small sizes in which the cell may be constructed permits it to be easily carried and permits it to be effectively used on any desired type of circuit requiring testing without fear of injury thereto or of the production of a spark.

Further advantages of the present invention arise from the construction of the cell whereby a circuit may be easily completed as may be desired.

I claim:—

1. In a voltaic cell, a conductor of the first class forming a casing, a second conductor of the first class therein, and an absorbent material between said conductors maintaining them in definite spaced relation, said casing having an opening adjacent one end permitting contact to be established at will with said second mentioned conductor and having an opening adjacent the opposite end enabling the addition of electrolyte, substantially as described.

2. In a voltaic cell, a conductor of the first class forming a casing, a second conductor of the first class entirely within said casing, and an absorbent material between said conductors, said casing being constructed to permit entry into said casing to establish detachable contact with said second-mentioned conductor and to permit the addition of the desired quantity of an electrolyte, substantially as described.

3. In a voltaic cell, a conductor of the first class forming a casing, a second conductor of the first class therein, an absorbent material between said conductors, said casing being constructed to permit entry thereinto to establish at will detachable contact with said second-mentioned conductor and to permit the addition of the desired quantity of an electrolyte, and a removable cover for said casing, substantially as described.

4. In a voltaic cell, a conductor of the first class forming a casing, a second conductor of the first class therein, an absorbent material between said conductors, said casing being constructed to permit contact with said second-mentioned conductor and to permit the addition of the desired quantity of an electrolyte, a removable cover for one end of said casing, and a removable conductor engaging means for the other end of said cell said cover and said means being interchangeably applicable at will to either end of said casing, substantially as described.

5. A testing instrument, comprising a casing of one metal, a coil spring of another metal therein, absorbent material between the different metals, and insulating disks at the ends of the casing, said casing being constructed to hold said disks in position with the spring under compression, and said disks being constructed to permit the addition of an electrolyte, at least one of said disks having an opening therethrough substantially the diameter of the opening through said coil spring to facilitate detachable frictional engagement with the inside of said spring, substantially as described.

6. A testing instrument, comprising a casing of one metal, a coil spring of another metal therein, absorbent material between the different metals, and insulating disks at the ends of the casing, said casing being constructed to hold said disks in position, and said disks being constructed to permit the addition of an electrolyte, at least one of said disks having an opening therethrough substantially the diameter of the opening through said coil spring to facilitate detachable frictional engagement with the inside of said spring, substantially as described.

7. A testing instrument, comprising a casing of one metal, a coil spring of another metal therein, absorbent material between the different metals, insulating disks at the ends of the casing, said casing being constructed to hold said disks in position with the spring under compression, said disks being constructed to permit the addition of an electrolyte, and a removable cap for one end of said casing, at least one of said disks having an opening therethrough substantially the diameter of the opening through said coil spring to facilitate detachable frictional engagement with the inside of said spring, substantially as described.

8. In a voltaic cell, a pair of conductors of the first class having absorbent material therebetween, and a protective casing for said conductors, said casing being constructed with a normally open opening in each end thereof to permit the making of electrical connection with the conductors at will, substantially as described.

9. In a voltaic cell, a casing having inturned ends providing at least one axial opening, an open coil of metal within said casing and forming a conductor of the first class, the opening in said coil being in alignment with said axial opening, and means normally maintaining said coil out of contact with said casing, substantially as described.

10. In a voltaic cell, a casing having inturned ends, disks of insulating material held in position by said ends, and a coil between said disks and normally urging the disks outwardly, said coil disks and casing having aligned openings for the reception of a conductor of the first class to establish contact with said coil, substantially as described.

11. In a voltaic cell, a casing providing at least one axial opening and an open coil of metal within said casing having an axial opening in alignment with said first mentioned axial opening and of substantially the same diameter as said first mentioned opening.

12. In a voltaic cell, a casing providing at least one axial opening an open coil of metal within said casing having an axial opening in alignment with said first mentioned axial opening and of substantially the same diameter as said first mentioned opening, and means normally maintaining said coil out of contact with said casing.

In testimony whereof I have hereunto set my hand.

WILLIAM BROAD.